United States Patent
Koster

(10) Patent No.: US 8,054,546 B2
(45) Date of Patent: Nov. 8, 2011

(54) GLASS FAçADES AS MEDIA SCREEN

(76) Inventor: Helmut Koster, Frankfurt (DE)

( * ) Notice: Subject to any disclaimer, the term of this patent is extended or adjusted under 35 U.S.C. 154(b) by 718 days.

(21) Appl. No.: 11/989,671

(22) PCT Filed: Jun. 21, 2006

(86) PCT No.: PCT/EP2006/005909
§ 371 (c)(1),
(2), (4) Date: Jan. 29, 2008

(87) PCT Pub. No.: WO2007/017003
PCT Pub. Date: Feb. 15, 2007

(65) Prior Publication Data
US 2009/0120594 A1    May 14, 2009

(30) Foreign Application Priority Data

Jul. 29, 2005 (DE) .......................... 10 2005 036 348

(51) Int. Cl.
*G03B 21/56* (2006.01)
*G02B 27/00* (2006.01)
*G02B 17/00* (2006.01)

(52) U.S. Cl. ......... 359/443; 359/449; 359/596; 359/597

(58) Field of Classification Search .................. 359/443, 359/449, 591, 596, 597, 459
See application file for complete search history.

(56) References Cited

U.S. PATENT DOCUMENTS 5,293,305 A * 3/1994 Koster .......................... 362/147
6,337,769 B1 * 1/2002 Lee ............................... 359/454

FOREIGN PATENT DOCUMENTS
KR    10-0305067    * 7/2001

* cited by examiner

*Primary Examiner* — Christopher Mahoney
(74) *Attorney, Agent, or Firm* — DLA Piper LLP (US)

(57) ABSTRACT

The invention relates to glass facades to be used as media screens 9, including slat reflectors 30, 31, 38, 39, 60, 61, 79, 90 arranged horizontally, one above the other, in front of, or behind, or between glass panes 80, 81 as receivers for artificial, projected, and natural light. The slat reflectors 27, 30, 31, 38, 39, 60, 61, 79, 90-92 receive and radiate sun 62 on their upper side 65, 100, 101. On their white lower side 30, 31, 82, 112, 123 they receive projected light 76, 105, 111 from an exterior light source, projecting from below upwards. The projection axis is aligned at an angle γ. The slat reflectors for projected light are orientated in an angle $\beta_1$ and form a scale shaped media screen. At least between the projection receiving parts of the slats a distance D is created.

16 Claims, 6 Drawing Sheets

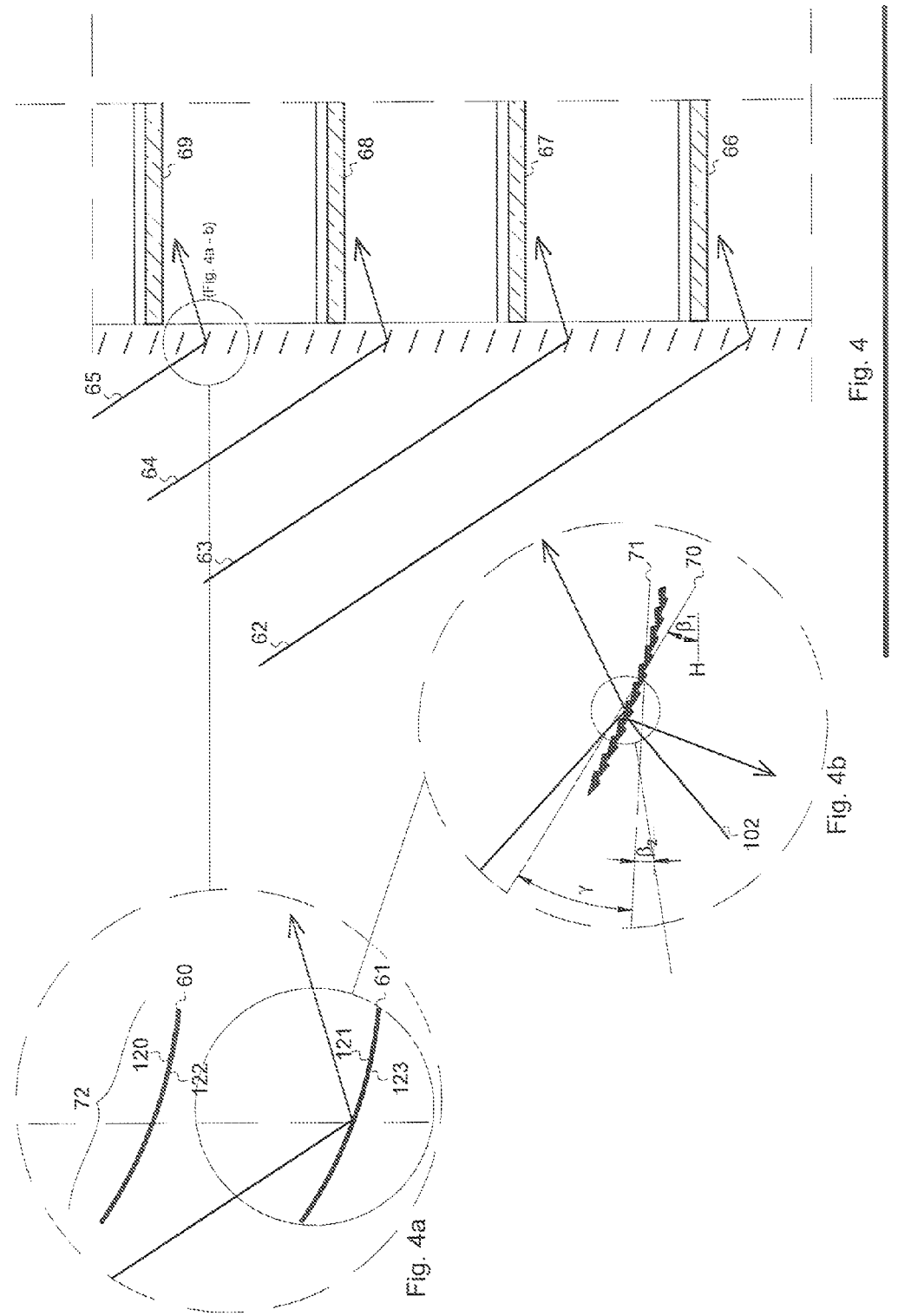

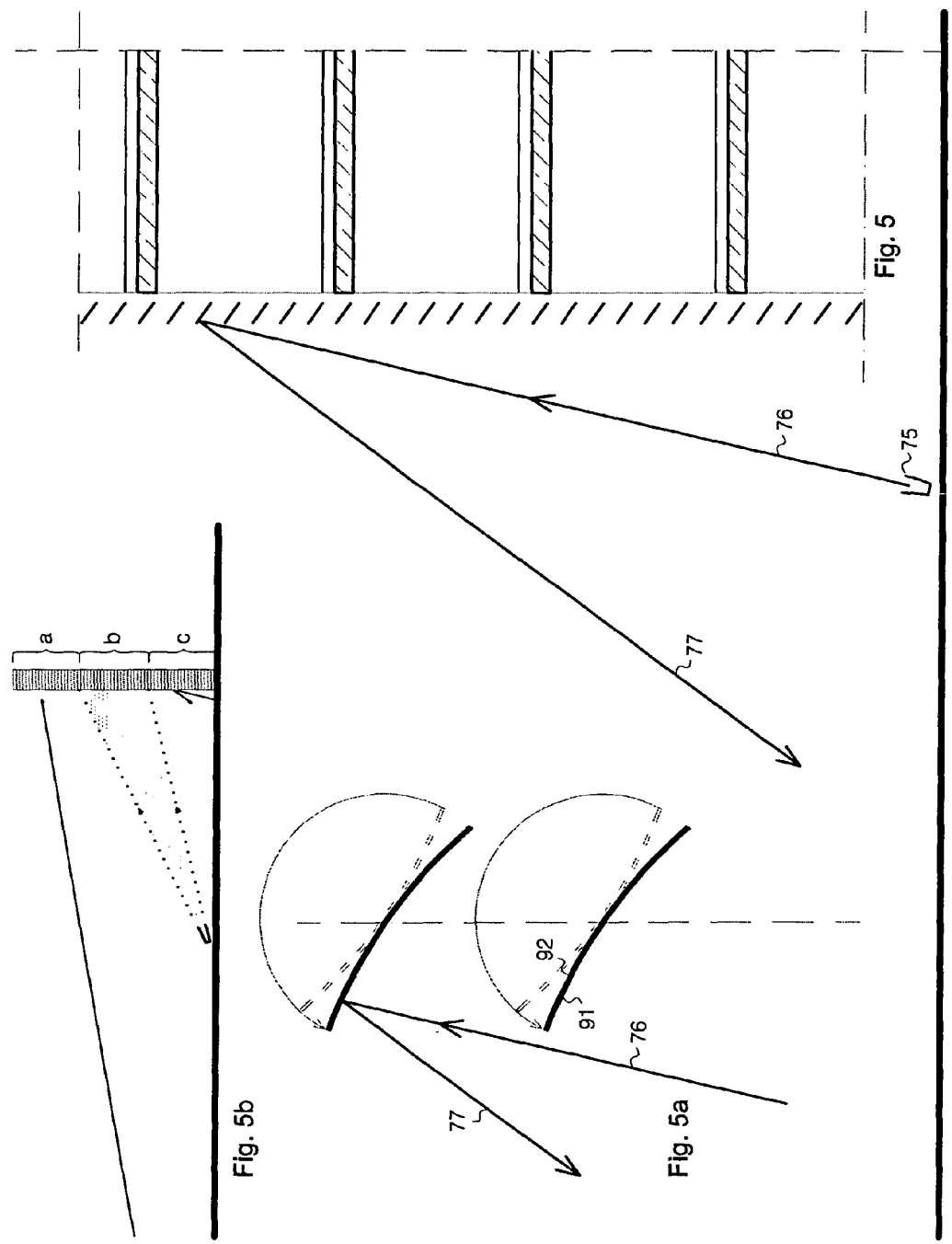

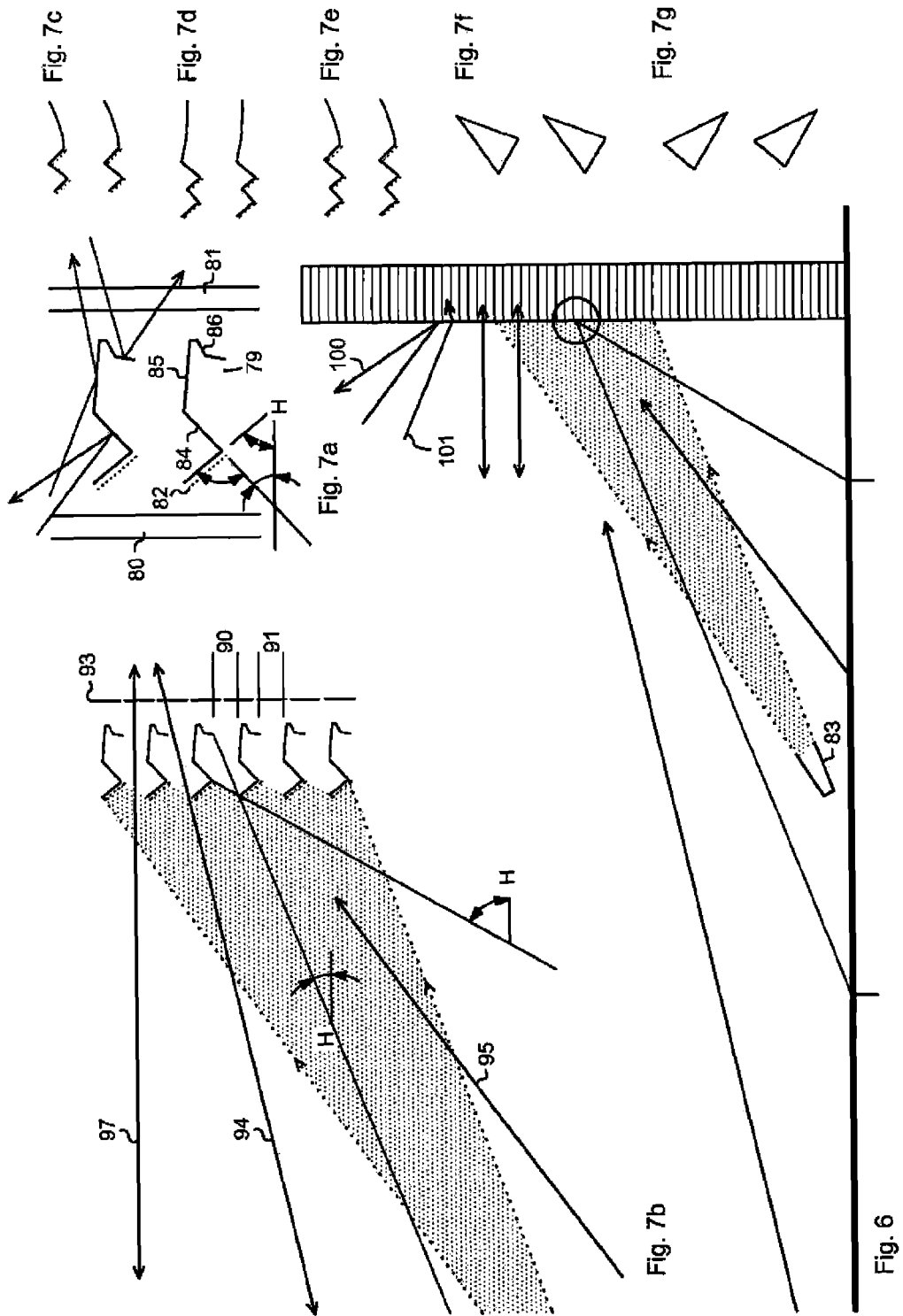

GLASS FAÇADES AS MEDIA SCREEN

The present invention refers to building glass façades to be used as media façades including slat reflectors arranged horizontally and one above the other, in front of, or behind, or between glass panes as radiation receivers for artificial, projected, and natural light, wherein at least two sides of the slat reflectors are formed to radiate light.

From Patent Specification AT 110 211 and from FR 2 080 198 A5, it has been known to project light images onto façades. It has also been known to print white or colored images onto glass façades, the print being illuminated from either the inside or the outside making the glass façades to so-called media façades in which the imprinted points light up. Such light-up is caused either by the influence of the sun or by irradiation with artificial light.

The disadvantage is, that with a view to the kind of print or description in the glass facades, the media message is fixed for ever. If the façade is neutrally printed, i.e. by an even dot screen, to serve as a neutral image screen for changing images, light slits will form between these points which will lead to a second image, for instance at the interior space ceiling, and thus depending on the point of observation from the outside, a blend of different images will be created at the façade, on one hand, and at the interior space ceiling, on the other. Moreover, the interior space is "optically polluted" since it contains only transmitted remains of the images.

It has also been known to arrange louvre-like reflectors to deflect the sun light for improved interior space illumination or for protection against the sun all in one façade plane. Most of the light guiding elements, for instance those from EP 0461137 B1, DE 4310718 A1, DE 4715358 A1, DE 2732592 A1 and others, however, have a reflective coating or mirror-coatinged. By such reflective mirror coatings, however, confused reflections are created since the mirrors have been developed for focusing and guiding the sun irradiation.

It has also been known to form light guiding slats reflective on the upper side and light absorbing on the lowerside, for instance gray, in order to avoid glare at the slat lower sides. Such color and absorption effects, however, destroy also an image projection onto the slats and which are—as are all colored slats—not to be uses as media screen.

From DE 20 2004 002 259 U1, a horizontal translucent slat structure has been known as façade element which serves for the protection from sun light, on one hand, and, by back projection onto the slat, as media screen on the other. The slat are pivotally supported about a horizontal axis and follow the sun or are rotated into a completely closed position in order to serve as an image screen. Thereby, the transparency through the glass façade is inhibited; of disadvantage, however, is that the interior space will be darkened as well. The projector is disposed at the interior space ceiling and radiates onto the back side of the slat façade so that from the street level light images can be perceived. The advantage of this innovation lies in the multi-functional use of the slat for day light and projected light. The disadvantage, however, obviously is that with a view to the back-projection technique, the slats have to be translucent, through which they either lose the sun protection function or, in case of less translucent formation, darken the interior space and, moreover, deprive the glass façade of its main function, namely the transparency. A further disadvantage of the back projection is the necessity of a plurality of projectors in each room behind the façade in order to obtain a larger, integrated total image on the façade. A still further disadvantage is the restricted use of the interior rooms in case of simultaneous back projection in the façade; if during the night the interior rooms are illuminated from inside to serve as a work room, the projected image will be over-radiated in view of the translucency of the façade and will thereby be destroyed or at least disturbed. In other words, the media façade will function only, if all lights in the building itself have been switched off. This constitutes a non-acceptable restriction of the use.

All previous techniques lack the simultaneousness of the following functions and properties to make use of the idea of the media façade on a large scale (for instance on a façade area of 1,000 square meters) as an information screen or as an advertising medium:

Façade as projection screen without any optical impairment and confusion of the user of the interior space Independent use of the interior space and of the interior space lighting without any light-technical impairment of the image screen function of the façade Transparency from the inside to the outside and vice versa Improved interior space lighting by the daylight.

The objects of the further developments consist in that glass façades be enabled by means of an integrated reflector technique to make it possible to project images from the street area onto the façade while neither the use of the interior space is disturbed nor the image projection or recognition of images projected on the façade is disturbed by light effects from the interior space, for instance indirect illumination. Neither should the interior space be darkened by the reflector technique nor should transparency from the inside to the outside be prevented. It is an objective to use the interior space undisturbed and, at the same time, to enable the façade to function as a media screen. Finally, the media screen, or the image screen, respectively, should additionally take over a sun protection function.

These extremely complex and partly even contradictory objectives are in fact obtained by the characterizing features of claim 1.

The advantage of the innovation is to make use of the slat reflectors for a double function, the deflection or redirection of the sun rays on one hand and, at the same time, for media screen functions on the other. Contrary to the prior art, however, the lower and upper sides of the slats are assigned definite functions:

the upper sides serve for daylight control the lower sides serve as media screenogy.

This definite assignment of functions requires that the slat surfaces be developed, by contour shaping, for specific functions. This means in the last consequence that the slats even in a fixed position have to fulfill all the different objectives as described above.

The intelligence of the glass façade lies in its multifunctional offer of use while not excluding individual functions.

The assignment of definite functions to the individual slat portions allowes to substantially maintain the glass façade in its transparency by keeping a distance between the slats as light and vision slits are kept between the slats. From the projection direction and observer direction, for instance looking upward from the street level; these slits are not, according to the invention, recognizable so that from these viewing directions a closed undisturbed media image screen is obtained.

By the following structural measures, the following will be obtained: the slats form a scale-like image screen wherein the individual slat scales are at an angle $\beta_1$ relative to the horizontal.

Further advantages will be explained in more detail based on the figures wherein FIG. 1 is a cross section through a building from different observer positions and one projection location onto the media facade;

FIG. 2a is a detail of the said slat reflectors;

FIG. 4 shows the daylight-technical deflection function of the reflectors;

FIG. 4a shows the slat reflectors at an enlarged scale;

FIG. 4b shows a toothed slat contour;

FIG. 5 shows the reflectors in reversed positioning as light guide for light sources from the street space back to the street space;

FIG. 5a shows a slat detail;

FIG. 5b shows the zoning of a high riser in various functions and function areas of the media facade;

FIG. 6 shows the media facade together with the various viewing positions thereof;

FIG. 7a shows a detailed cross section through slat reflectors;

FIG. 7b shows the image planes on, and between, respectively, the slat reflectors; and FIG. 7c-7g show further variations of the slats.

Figure 1:
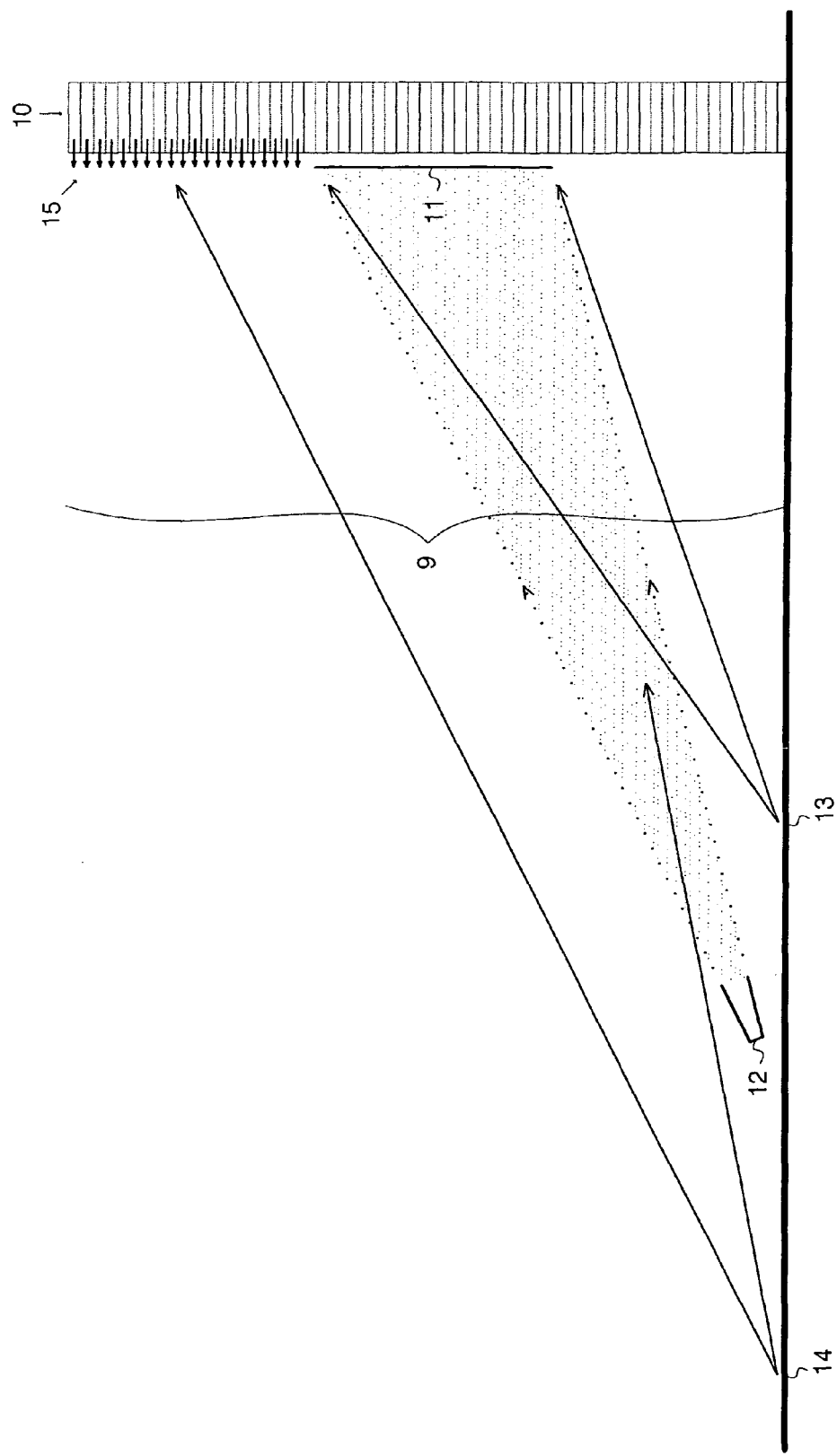

FIG. 1 constitutes an instruction for the designer of a glass façade of a building 10, wherein the viewing positions 13, 14 and the projector location 12 are defined. The projection plane 11 characterizes the glass media façade irradiated by a projector 12. The location 13 shows the viewing position of an observer near the building onto projection plane 11. Location 14 shows a viewing position to the building from a larger distance. The arrows 15 in the upper floors symbolize simultaneously the transparency through the complete media façade from the inside to the outside on all floors.

Figure 2:
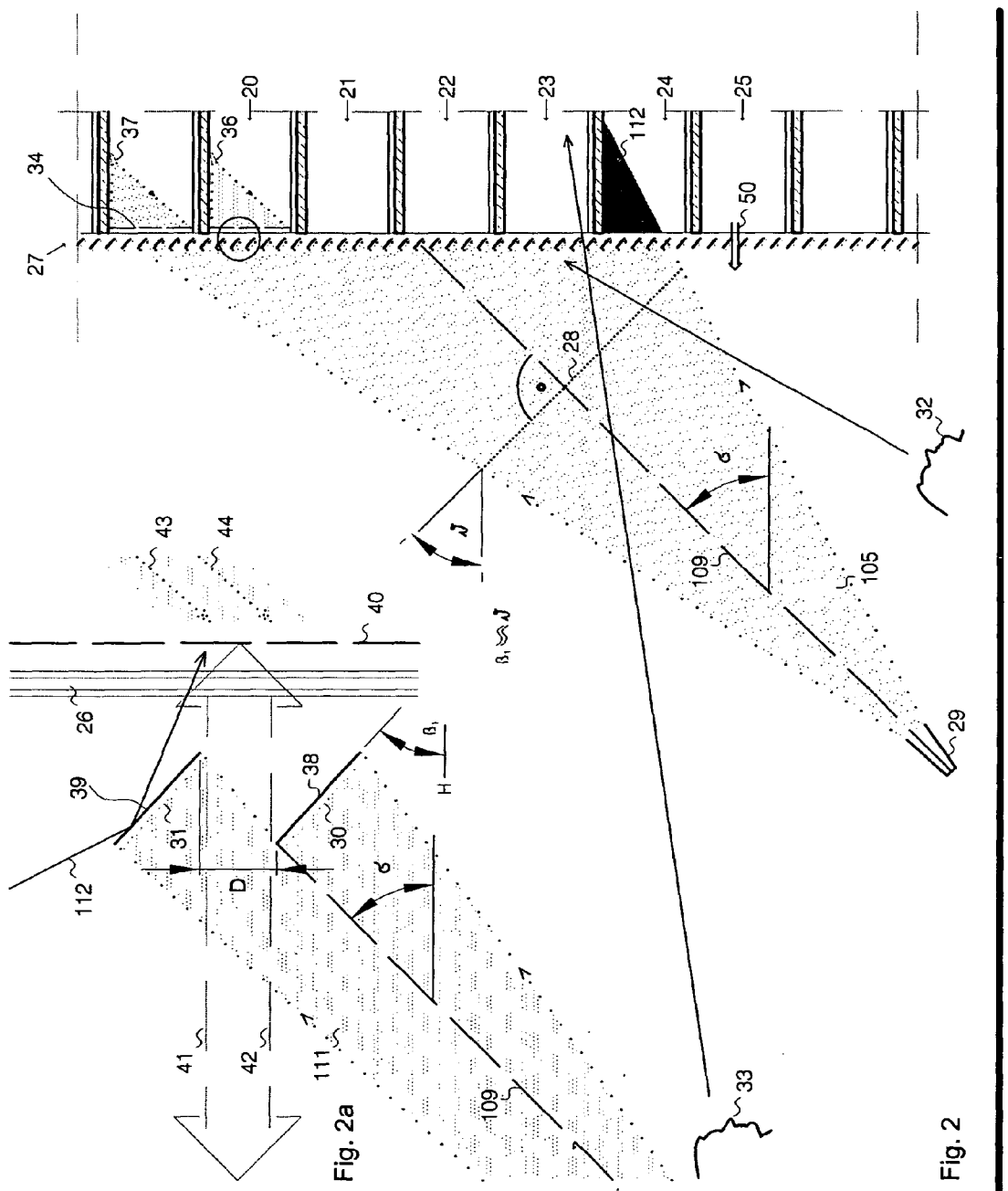
FIG. 2 is a scale-shaped formation of the slat reflectors in the glass facade.

FIG. 2 shows a section of the glass media façade over floors 20 to 25. In front of the glass façade 26, slat reflectors 27 are located forming a scale-shaped media screen 28, displaced in a vertical plane, as projection plane, onto which by means of a projector 29, films, slides, color scenarios are projected. The screen function of the slat reflectors is defined by the dotted lines 30, 31 in FIG. 2a. An exclusive view of the projected images is obtained from a position perpendicular to the projection plane 28. Angle δ of projection plane 28 corresponds to slat angle $β_1$ relative to the horizontal H in FIG. 2a. This downwardly directed positioning of the reflector portions constitutes an essential advantage of the invention. The scale-shaped reflectors are self-shading relative to zenith- and sky radiation, they appear, therefore, darker than a vertical projection plane and, because shaded, are particularly well suited as media screen in the façade, also during day. The projectors are directed in the projection axis 109 onto the façade. The projection axis forms an angle σ to the horizontal, wherein the closing angle, defined by the angle $β_1$ of the slat reflectors and the distance D between the slats is defined by the rule no projected light to penetrate into the space between the slats.

The reflectors 27 then produce a shade 112 at the interior space ceiling, shown at the example of space 24. The interior space remains, as in accordance with the objectives of the present invention, undisturbed by the light images projected to the façade from outside. According to the invention, the slat reflectors do not only form an image screen towards the street level but also a protective screen for the interior space.

From a position 33, two observer scenarios can be recognized which form an aim of the invention and an urban developmental/architectural advantage, viz.
1. the projection scenario on the lower sides of the slats,
2. the lighted interior spaces, and the scenario of a second image plane behind the projection plane of the slat reflectors 27, respectively.

With a growing distance to the building, the second image plane will become more and more clearly recognizable so that the building, depending on the distance, simultaneously speaks two image languages simultaneously, viz. a projected-on image or color language and an internal outwardly effective light, color or image language. This is a big advantage and a surprising effect of the glass media façade according to the invention. The building may for instance develop in the city silhouette a very special light, color or image language and may have, from the vicinity of the building, i.e. from the street space, for instance at the lower part of the building, a further special light, color or image language.

This is obtained by the defined closing angle σ of the slat reflectors or the slat reflectors 30, 31, arranged at a distance relative to each other in an angular position, respectively, which also permit the advantageous transparency 41, 42 from the inside to the outside and vice versa.

Figure 3:
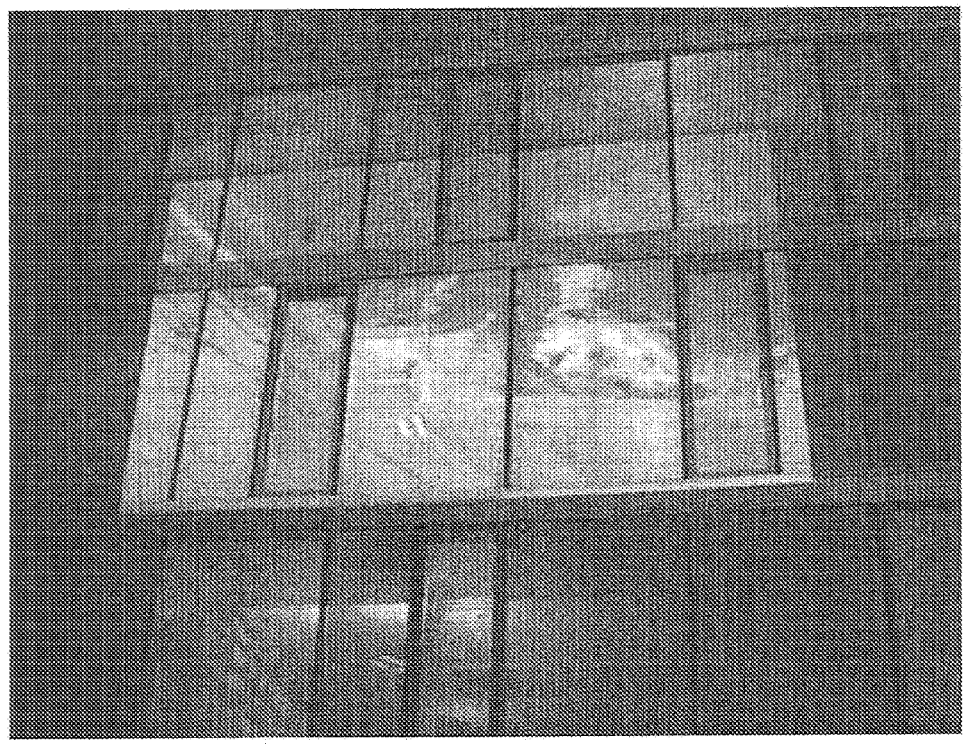
FIG. 3 is a photo of a glass facade as media facade according to the invention.

The photo under FIG. 3 clarifies this; in the upper floor, only the projected film is recognizable. Because of the flat angle<σ on the lower floor, the interior space scenario there is recognizable as well.

The media effects made possible by the glass façade may be supported by separate additional projectors 36, 37, which radiate from the interior space onto the back side of a light-colored translucent roller blind as second image screen plane 34, which can for instance be drawn down from the lintel and may, during daytime, serve as additional glare protection.

FIG. 2a shows the second image screen plane 40 having the viewing position 41, 42 from a great distance and the image projection 43, 44 from the back side. If one wishes to go without the second image screen plane 40 by drawing the roller blinds up, the view relation from the inside to the outside, and vice versa, is opened.

By the arrangement of the slat reflectors 30, 31 according to the invention, the view from the interior of the building into the projectors 29 is precluded as well (FIG. 2). The interior life of the building goes on undisturbed by the light, color or image world brought in from projector 29.

The slat reflectors, on their upper sides 38, 39, are provided as daylight reflectors in white or metallic-reflective and deflect the incoming daylight and the sun 112 to the interior space. In order to cut out direct sun, the slat reflectors are rotated at about 90° against the sun.

The multi-medial outside effect of the façade and the undisturbed interior space function of the building, on one hand, and the multi-functionality of the slat reflectors, on the other, together with the illuminating and shading functions thereof, as well as the image screen functions thereof depending on the observer positions from the street space or on the city silhouette, constitute the main idea of the invention. Here, the language of architecture unite with the structural façade design by the slats and of the glass design of the building (architect) with the light design of the façade (light planner) and the air conditioning function of the façade (building physicist) as well as the function of the façade as a advertising space (media planner) in an urban development context (urban development).

FIG. 4 and FIG. 4a show the double functions of the slat reflectors. On their upper side 120, 121, the slat reflectors 60, 61 are reflective or at least gleaming like metal, and on the lower side 122, 123 thereof, they are white. Depending on the radiation angle σ by the projectors, the white lower side forms an image screen while the slat reflectors on the upper sides deflect sun and daylight 62 through 65 to the interior space ceiling 66 through 69.

The slat reflectors 60, 61 are shaped as concave/convex slats. The geometric shape of the slats is not, however, restricted thereto. The slat reflectors 60, 61 may also at the upper side thereof be convex and below may be concave or may three-dimensionally be shaped convex on both sides.

As a distinction relative to commercial Venetian blind slats, it should be stated that these, as a rule, are rotated 90° against the sun, so that incident sun light is deflected and, from below from the street space, it is possible to look into the building. The disadvantage is that the common Venetian blinds cannot serve at the same time as media façade and would therefore need a permanent tracking.

Of particular interest, therefore, is a tooth-shaped structuring of the slat surfaces according to FIG. 4b, by which additional advantageous effects may be obtained. The tooth flanks on the lower side permit optimum irradiation 102 as image screen and de-glare the view on the slat from the interior space in that the small angled tooth flanks are shaded when viewed from the interior space. According to the invention, therefore, the interior space remains uninhibited by the projected irradiation.

By a tooth-shaped structure at the upper side of the slats, improved light redirection effects may be obtained at the ceiling. In this case, too, the tooth-shaped form leads to the effect, that when viewing the slats from the inside, they are glare free. In concave/convex slats different reflection planes 70, 71 of the two surfaces have specific light deflecting effects, which may be obtained by an opposite inclination of the tooth flanks 70, 71. By an altered tooth shape on the upper sides of the slat reflectors, for instance by a steeper inclination $\beta_2$ (FIG. 7a) of the sun-irradiated tooth flanks, the sun energy may even be shut out in order to protect the building against overheating. Depending on the structure and the inclination of tooth flanks 70, 71, the slat may also be rotated into a flat position and yet still be light deflective on the slat upper side and may take over an media screen function towards the street. It may, therefore, well be advantageous to select the angle $\beta_2$ relative to the horizontal steeper or more flat and the angle $\beta_1$ on the slat lower side smaller. It may well be sensible to also assume the angle γ (FIG. 4b) between the tooth flanks as larger, for instance as 90°. The inclination of the tooth flanks will further be discussed on the example of a macro structure in FIGS. 7a and 7b.

Considering the pollution, it is possible to also install reflectors having a smooth surface on the upper side on the exterior side of the building, the tooth-shaped slat reflectors should be arranged behind a glass plane in the insulating glass or in the interior space.

As the slat size 72 any size may be selected. Slats disposed outside may for instance have a slat width of up to 1 m or more. Slats built into insulating glass are reduced to a width of 15-20 mm or smaller. The tooth-shaped formation of the slats, too, may depending on the production method be reduced up to a micro structure size with tooth flanks<0.1 mm, or may be made at a larger scale. It is also possible to punch out the slat reflectors from a sheet like an expanded metal so that a sheetlike slat reflector element is formed which can be disposed as an inlet between two panes or be cast in acrylic.

In FIG. 5, a further advantageous application of the façade is shown. The slats from FIG. 4 and FIG. 4a are rotated for >90° and form now reflectors for exterior luminaires 75. The rays 76 impinge upon the metallic-gleaming slat side 91 and deflect the light 77 back into the street space. In this way, the media façade, or parts of the façade, also acts as light reflector for street or square lighting. The white lower side of the slat 92 is now turned to show upside.

When employed on high risers, a media façade may fulfill different functions simultaneously. FIG. 5b shows the zoning of the façade into a zone a for street lighting, a zone b as image screen, for instance for advertising, and a zone c for a long-distance effect of the building on a city silhouette. The concept of media façade comprises all zones a, b and c. The media façade permits the simultaneousness of different functionalities within one façade. Zone c is shown enlarged in FIG. 5. FIG. 5 shows a concave/convex formation of the slat reflectors. By rotating the slats, the white-reflective side 92 is set to show upward, the mirroring side 91 is rotated to face downward and makes it possible to illuminate an outside space 77 in front of the building by deflected light radiation 76 from luminaire 75.

FIG. 6 shows once more the various viewing positions from FIG. 7a into the media façade or from the building as well as the daylight-technical deflection of the slats for improved space illumination and for the protection against overheating, with the mirror reflectors from FIG. 7a in a fixed position. These reflectors, which may also be mounted for tilting or lifting are folded and form differently directed action planes, as has already been discussed based on FIG. 4b for the toothed micro-structured slat.

FIG. 7a shows such a reflector 79 which at a scale of 1:1 has a width of about 20 mm and advantageously is disposed between two panes 80, 81, for instance in an insulating glass. The reflector 79 shows with one reflector portion 82 at an angle $\beta_1$ relative to the horizontal to the street level and forms an image screen for a projector 83 from FIG. 6 which is shaded relative to zenith irradiation. The reflector portion 84 at an angle $\beta_2$ serves to deflect direct overheating sun irradiation 100. The reflector portion 85 serves to guide-in day light 101 to improve room lighting. Reflector portion 86 serves to deflect artificial indirect illumination 103 from the inside into the façade.

Between the reflectors 79 in FIG. 7a, views 94, 97 can, in case of an advantageous horizontal positioning, be obtained that permit a view from the inside to the outside and from the outside to the inside. In the interior, an anti-glare roller blind 92 is provided, which serves as a second image screen plane as in accordance with the explanations relative to 40, 42 from FIG. 2 and FIG. 2a.

The advantage of this specific contrary rotation of the reflection planes 82 and 84 is the definite orientation of the image planes as has already been explained in connection with FIG. 4b. The reflector portion 82 for projected light forms an definite orientation to the street plane. Light reflexes from the projector to reflector portion 82 will not penetrate into the interior space. Contrary thereto, the reflection plane displaced for about 90° of the daylight reflector 84 serves for shutting out the overheating sun. Artificial illumination flooding forward from the interior onto the reflector portion 86 does not disturb the image on the reflector portion 82. The reflectors shade themselves mutually. In order to avoid reflections of the different image planes in the glass panes, non-reflecting glasses may be used for the outer panes 80. A vaporized heat reflection mirror 105, common in insulating glasses, should in any case be applied on the outer side of interior pane 81.

In FIG. 7b, the angles of view on the various projection planes are given. Angles of view<$\alpha_2$ from a large distance open the view 94 to the second image screen plane 92 or into the interior space. Views 95 at an angle>$\alpha_2$ and <$\alpha_1$, make optimum perception of the images 96 projected on the façade possible. In the horizontal direction of view 97, there is the best view from the inside to the outside between reflector slats 90, 91.

FIGS. 7c, 7d, 7e, 7f, 7g show further developments of the present invention including v- or w-shaped first portions oriented to the outer space and various light reflectors to the interior space. The invention is however not restricted to the described tooth-shaped or macro-structured, v- or w-shaped folded slat shapes, the slat may for instance also be triangular as shown in FIG. 7f or 7g.

The invention claimed is:

1. Glass facades of multi-story buildings to be used as large scale media facades (9) including
    slat reflectors (30, 31, 38, 39, 60, 61, 79, 90) arranged horizontally and one above the other, in front of, or behind, or between glass panes (80, 81) as receivers for artificial, projected, and natural light sources, wherein at least two outside oriented sides of the slat reflectors (91 and 92, 82 and 84) are formed to reflect both light sources hitting the facades from an outside, wherein:
    the slat reflectors (27, 30, 31, 38, 39, 60, 61, 79, 90, 91, 92) receive, and radiate, at the upper side thereof, sun (62 through 65, 100, 101) and at the lower side thereof (30, 31, 82, 112, 123) projected light (76, 105, 111) the slat reflectors, at least at the lower side thereof (30, 31, 82, 112, 123), are coloured white and
    electric light (105) is projected at least from the exterior from a large distance directly or indirectly by a mirror from below upwards onto the glass facade by a punctual light source
    reflector portions (30, 31, 82, 122, 123) of the slat reflectors for projected light form an angle of inclination $\beta_1$ relative to the horizontal
    the reflector portions (30, 31, 82, 112, 123) form a scale-shaped media screen
    the slat reflectors (27, 30, 31, 38, 60, 61, 79, 90, 91, 92, 99) or at least portions of the slat reflectors (30, 31, 82, 112, 123) include, at least in the media screen position, a slit-shaped distance (D) relative to each other,
    the slit-shaped distance (D) is set so that a angle σ results, and
    the projection axis (109) of projector (29) is approximately aligned at an angle σ.

2. Glass facades according to claim 1, characterized in that the slat reflectors are tooth-shaped, at least at the lower side thereof so that one tooth side serves as the receiver for projected radiation and the bent tooth side remains unexposed.

3. Glass facades according to claim 1, characterized in that tooth flanks (70, 71) facing daylight and those facing projected light are disposed at an angle γ of from about 60° to 100° relative to each other.

4. Glass facades according to claim 1, characterized in that portions of the slat reflectors (84) are formed for daylight guiding and portions of slat reflectors (82) are formed for reflecting projected light.

5. Glass facades according to claim 1, characterized in that the slats (79) on the slat portion facing the exterior space are folded in v or w shape and that the slats include, in the horizontal position, at least one first slat portion (82) having an angle of inclination $\beta_1$ of about 30° to 50° relative to the horizontal H and serve as the image screen for light projected from below, and that at least a second portion (84) facing daylight is disposed at an angle of $\beta_2$ relative to the horizontal H in order to reflect sun (100) and that the slats to the interior space include at least one further portion (85) and that daylight (100) impinging on the latter can be deflected to the interior space ceiling.

6. Glass facades according to claim 1, characterized in that the slat reflectors are punched out, similar to expanded metal, from a sheet and are integrated, as a laminar inlet, in front of, or within, the glass facade.

7. Use of the glass facade according to claim 1, characterized in that the slats are tilted into their opposite position, so that the daylight reflectors (91) are irradiated by luminaries (75) from the street level and the electric light (76) being reflected back by the daylight reflectors (91) to the street level.

8. A glass facade for multi-storey buildings to be used as large scale media glass facade, including slat reflectors (30, 31, 38, 39, 60, 61, 79, 90) arranged horizontally and one above the other, in front of, or behind, or between glass panes (80, 81) as receivers for artificial, projected, and natural light, wherein at least two sides of the slat reflectors (91 and 92, 82 and 84) are formed to radiate light, characterized in that
    the slat reflectors (27, 30, 31, 38, 39, 60, 61, 79, 90, 91, 92) receive, and radiate, at the upper side thereof, sun (62 through 65, 100, 101) and at the lower side thereof (30, 31, 82, 112, 123) projected light (76, 105, 111) the slat reflectors, at least at the lower side thereof (30, 31, 82, 112, 123), are colored white
    light (105) can be projected at least from the exterior from below upwards onto the glass facade
    reflector portions (30, 31, 82, 122, 123) of the slat reflectors for projected light form an angle of inclination $\beta_1$ relative to the horizontal
    the reflector portions (30, 31, 82, 112, 123) form a scale-shaped media screen
    the slat reflectors (27, 30, 31, 38, 60, 61, 79, 90, 91, 92, 99) or at least portions of the slat reflectors (30, 31, 82, 112, 123) include, at least in the media screen position, a slit-shaped distance (D) relative to each other,
    the slit-shaped distance (D) is set so that a closing angle σ results, and
    the projection axis (109) of projector (29) is approximately aligned at an angle σ, and
    further characterized in that on the side of the interior space, behind the slats (27, 90) a translucent anti-glare roller blind (34, 40, 93) is arranged as a translucent screen for inside projectors (36, 37).

9. A building glass facade to be used as media facade (9) including slat reflectors (30, 31, 38, 39, 60, 61, 79, 90) arranged horizontally and one above the other, in front of, or behind, or between glass panes (80, 81) as receivers for artificial, projected, and natural light, wherein at least two sides of the slat reflectors (91 and 92, 82 and 84) are formed to radiate light, characterized in that
    the slat reflectors (27, 30, 31, 38, 39, 60, 61, 79, 90, 91, 92) receive, and radiate, at the upper side thereof, sun (62 through 65, 100, 101) and at the lower side thereof (30, 31, 82, 112, 123) projected light (76, 105, 111)
    the slat reflectors, at least at the lower side thereof (30, 31, 82, 112, 123), are colored white and
    light (105) can be projected at least from the exterior from below upwards onto the glass facade
    reflector portions (30, 31, 82, 122, 123) of the slat reflectors for projected light form an angle of inclination $\beta_1$ relative to the horizontal
    the reflector portions (30, 31, 82, 112, 123) form a scale-shaped media screen
    the slat reflectors (27, 30, 31, 38, 60, 61, 79, 90, 91, 92, 99) or at least portions of the slat reflectors (30, 31, 82, 112,

123) include, at least in the media screen position, a slit-shaped distance (D) relative to each other, the slit-shaped distance (D) is set so that a closing angle σ, and the projection axis (109) of projector (29) is approximately aligned at an angle σ, and further characterized in that the light projector radiates from the building glass facade, directs the light to a mirror disposed in front of the facade, and that images can be deflected through the mirrors on to the building glass facade.

10. Building glass facade according to claim 9, characterized in that the slat reflectors are tooth-shaped, at least at the lower side thereof so that one tooth side serves as the receiver for projected radiation and the bent tooth side remains unexposed.

11. Building glass facade according to claim 9, characterized in that tooth flanks (70, 71) facing daylight and those facing projected light are disposed at an angle γ of from about 60° to 100° relative to each other.

12. Building glass facade according to claim 9, characterized in that portions of the slat reflectors (84) are formed for daylight guiding and portions of slat reflectors (82) are formed for reflecting projected light.

13. Building glass facade according to claim 9, characterized in that the slats (79) on the slat portion facing the exterior space are folded in v or w shape and that the slats include, in the horizontal position, at least one first slat portion (82) having an angle of inclination $\beta_1$ of about 30° to 50° relative to the horizontal H and serve as the image screen for light projected from below, and that at least a second portion (84) facing daylight is disposed at an angle of $\beta_2$ relative to the horizontal H in order to reflect sun (100) and that the slats to the interior space include at least one further portion (85) and that daylight (100) impinging on the latter can be deflected to the interior space ceiling.

14. Building glass facade according to claim 9, characterized in that the slat reflectors are punched out, similar to expanded metal, from a sheet and are integrated, as a laminar inlet, in front of, or within, the glass facade.

15. Use of the building glass facade according to claim 9, characterized in that the slats are tilted into their opposite position, so that the daylight reflectors (91) are irradiated by luminaries (75) from the street level and the electric light (76) being reflected back by the daylight reflectors (91) to the street level.

16. Building glass facade according to claim 9, characterized in that on the side of the interior space, behind the slats (27, 90) a translucent anti-glare roller blind (34, 40, 93) is arranged as a translucent screen for inside projectors (36, 37).

* * * * *